UNITED STATES PATENT OFFICE.

JOSEPH G. COLCORD, OF BOSTON, MASSACHUSETTS.

IMPROVEMENT IN COMPOSITIONS FOR COATING MARINE CLOTHS.

Specification forming part of Letters Patent No. 130,279, dated August 6, 1872.

*To all whom it may concern:*

Be it known that I, JOSEPH G. COLCORD, of Boston, in the county of Suffolk and State of Massachusetts, have invented an Improved Composition for Coating Marine Cloths; and I do hereby declare that the following is a description of my invention sufficient to enable those skilled in the art to practice it.

My invention relates to the manufacture of a paint or composition for surfacing or coating marine cloths or cloths used about vessels for covers and exposed to saline influences.

Great difficulty has been experienced in coating such cloths with any composition which will be pliable and enduring and free from tackiness, and large quantities of cloth are spoiled by reason of bad coating.

My improved paint or composition forms an impermeable, elastic, pliable, and enduring coating, free from any tendency to tackiness or to crack. Its preparation is as follows:

For a prime coating, I take the parts in the proportion of one and one-half pound of lamp-black, one pound of red lead, one pound of litharge, one-quarter of a pound of manganese, and one pound of bees-wax. I cut the bees-wax into small pieces and incorporate all the above parts well together, and with one gallon of boiled linseed-oil, and heat and boil the mixture moderately in a suitable kettle, stirring the mixture until the wax is all dissolved and well united with the paint. To thin this composition I use three parts of boiled linseed-oil and one of japan drying.

The cloth to be coated is wet with salt-water, so as to be thoroughly damp, but no more, and the composition is applied with a suitable brush when warm. The first coat thus made I surface or outer-coat with a similar composition, minus the manganese and bees-wax, the lamp-black, red-lead, and litharge being thoroughly mixed with one gallon of boiled linseed-oil, and boiled three-quarters of an hour, adding one pint of spirits of turpentine, thinning as with the first coat, and applying as with the first coat. The addition of the wax imparts an elasticity to the coating and a flexibility to the cloth.

I claim—

For coating marine cloths, a composition formed of the ingredients proportioned and prepared substantially as above described.

JOSEPH G. COLCORD.

Witnesses:
 FRANCIS GOULD,
 M. W. FROTHINGHAM.